United States Patent
Weiteneder et al.

(10) Patent No.: US 6,909,547 B2
(45) Date of Patent: Jun. 21, 2005

(54) SECURITY ELEMENT WITH DIFFRACTION STRUCTURES

(75) Inventors: Christoph Weiteneder, Neuchâtel (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/496,321

(22) PCT Filed: Oct. 15, 2002

(86) PCT No.: PCT/EP02/11486
§ 371 (c)(1),
(2), (4) Date: May 13, 2004

(87) PCT Pub. No.: WO03/043832
PCT Pub. Date: May 30, 2003

(65) Prior Publication Data
US 2005/0030626 A1 Feb. 10, 2005

(30) Foreign Application Priority Data
Nov. 23, 2001 (DE) .......................................... 101 57 534

(51) Int. Cl.[7] .................................................. G02B 5/18
(52) U.S. Cl. ....................... 359/569; 359/573; 359/567; 359/566; 283/86
(58) Field of Search ................................ 359/569, 573, 359/566, 567, 575, 1, 2, 900; 283/86, 93

(56) References Cited

U.S. PATENT DOCUMENTS

| | | | |
|---|---|---|---|
| 4,629,647 A | * 12/1986 | Sander | ........................ 428/172 |
| 4,728,377 A | * 3/1988 | Gallagher | ..................... 156/58 |
| 4,856,857 A | 8/1989 | Takeuchi et al. | |
| 4,874,213 A | 10/1989 | Cowan | |
| 4,984,824 A | * 1/1991 | Antes et al. | ................... 283/91 |
| 5,956,164 A | 9/1999 | Waitts | |
| 6,324,004 B1 | * 11/2001 | Staub et al. | ................. 359/567 |

FOREIGN PATENT DOCUMENTS

| | | |
|---|---|---|
| DE | 3308831 A1 | 5/1984 |
| DE | 100 28 426 A1 | 4/2001 |
| EP | 0 105 099 A1 | 4/1984 |

* cited by examiner

Primary Examiner—Fayez G. Assaf
(74) Attorney, Agent, or Firm—Hoffman & Baron, LLP

(57) ABSTRACT

A security element (2) comprising a plastic laminate has a surface pattern (12) composed mosaic-like from surface elements (13; 14; 15). Shaped into at least two of the surface elements (14; 15) is a respective diffraction structure $\{B(x, y, T)\}$ produced from a superimposition of a low-frequency grating structure $\{G(x, y)\}$ with a high-frequency relief structure $\{R(x, y)\}$. In the one surface element (14) a grating vector of the grating structure $\{G(x, y)\}$ and a relief vector of the relief structure $\{R(x, y)\}$ are parallel and in the other surface element (15) the grating vector (16) and the relief vector (17) include a substantially right angle. In addition the grating vectors (16) of the grating structures $\{G(x, y)\}$ in the two surface elements (14; 15) are parallel. A common boundary (18) of the two surface elements (14; 15) is visible only upon lighting with linearly polarized light, in daylight both surface elements (14; 15) have the same surface brightness.

10 Claims, 3 Drawing Sheets

SECURITY ELEMENT WITH DIFFRACTION STRUCTURES

This application claims priority based on an International Application filed under the Patent Cooperation Treaty, PCT/EP02/11486, filed on Oct. 15, 2002, and German Patent Application No. 101 57 534.3, filed on Nov. 23, 2001.

BACKGROUND OF THE INVENTION

The invention relates to a security element with diffractions structures as set forth in the classifying portion of claim 1.

Such security elements comprise a thin layer composite of lacquer and/or plastic material, wherein embedded in the layer composite are at least relief structures from the group of diffraction structures, light-scattering structures and flat mirror surfaces. The security elements which are cut from the thin layer composite are glued onto articles for verifying the authenticity thereof.

The structure of the thin layer composite and the materials which can be used for that purpose are described for example in U.S. Pat. No. 4,856,857. It is known from DE 33 08 831 A1 for the thin layer composite to be applied to the article by means of a carrier film.

Security elements of that kind generally have a pattern of surface elements which are composed in a mosaic-like fashion and which are occupied by the microscopically fine relief structures. The pattern changes in a predetermined manner when the security element is tilted or rotated. Such a security element is known from EP 0 105 099 A1. So that the pattern can be easily recognized by an observer and, when the security element is tilted or rotated, appears as a striking, variable play of colors or iridescence effect, the microscopically fine relief structures of the surface elements have to deflect the light incident on the security element into the first few diffraction orders. The microscopically fine relief structures which satisfy that condition have structure elements which in principle can be copied with holographic means. Although the expenditure for producing a copy is high, there is nonetheless the need to be able to easily recognize counterfeit or copied patterns.

SUMMARY OF THE INVENTION

The object of the invention is to provide a security element which exhibits a brilliant surface pattern variable upon rotating or tilting thereof, which is difficult to copy and the authenticity of which can be checked with simple means.

According to the invention the specified object is attained by the features recited in the characterizing portion of claim 1. Advantageous configurations of the invention are set forth in the appendant claims.

BRIEF DESCRIPTION OF THE DRAWINGS

Embodiments of the invention are described in greater detail hereinafter and illustrated in the drawing in which.

DESCRIPTION OF THE PREFERRED EMBODIMENTS

Figure 1:
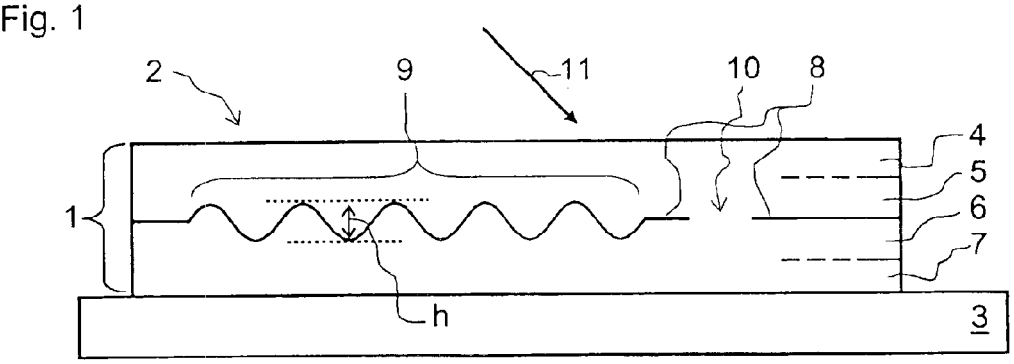
FIG. 1 shows a view of a security element in cross-section.

In FIG. 1, reference 1 denotes a layer composite or laminate, 2 denotes a security element, 3 a substrate, 4 a cover layer, 5 a shaping layer, 6 a protective layer, 7 an adhesive layer, 8 a reflecting boundary layer, 9 an optically effective structure and 10 a transparent location in the reflecting boundary layer. The layer composite or laminate 1 comprises a plurality of layers of various plastic or lacquer layers which are successively applied to a carrier film (not shown) and in the specified sequence typically includes the cover layer 4, the shaping layer 5, the protective layer 6 and the adhesive layer 7. In one configuration the carrier film can be formed by the cover layer 4 itself; in another configuration the carrier film can serve for applying the thin layer composite 1 to the substrate 3 and is thereafter removed from the layer composite 1, as described in above-mentioned DE 33 08 831 A1.

The common boundary surface between the shaping layer 5 and the protective layer 6 is referred hereinafter as the interface 8. The optically effective structures 9 of an optically variable pattern are shaped in the shaping layer 5. As the protective layer 6 fills the depressions of the optically effective structures 9, the interface 8 is in the shape of the optically effective structures 9. In order to achieve a high level of effectiveness in respect of the optically effective structures 9, the interface 8 is formed by a metal coating, preferably of aluminum, silver, gold, copper, chromium, tantalum and so forth, which separates the shaping layer 5 and the protective layer 6 and which, by virtue of its electrical conductivity, affords a high reflection capability for visible light at the interface 8. The layer composite 1 is produced as a plastic laminate in the form of a long film web, with a plurality of mutually juxtaposed copies of the optically variable pattern. The security elements 2 are for example cut out of the web of film and joined to a substrate 3 by means of the adhesive layer 7. The substrate 3, most in the form of a document, a banknote, a bank card, an identity pass or another important or valuable article, is provided with the security element 2 in order to verify the authenticity of the article.

At least the cover layer 4 and the shaping layer 5 are transparent in relation to visible light 11 incident on the security element 2. The incident light 11 is reflected at the interface 8 and deflected in a predetermined manner by the optically effective structure 9. Diffraction gratings, light-scattering relief structures or flat mirror surfaces serve as the optically effective structure 9. In some embodiments of the security element 2 the transparent locations 10 are let into the interface 8, at which the reflecting metal coating is interrupted, so that indicia which are under the security element 2 and which are disposed on the substrate 3 can be perceived through the security element 2. It will be appreciated that, in those embodiments, the protective layer 6 and the adhesive layer 7 are also transparent. For particularly thin configurations of the layer composite 1, in place of the protective layer 6, only the adhesive layer 7 is applied, particularly when the adhesive is a hot melt adhesive which only develops its adhesiveness at a temperature around 100° C. Above-mentioned U.S. Pat. No 4,856,857 shows various embodiments of the layer composite 1 and lists the materials which can be used for same.

Figure 2:
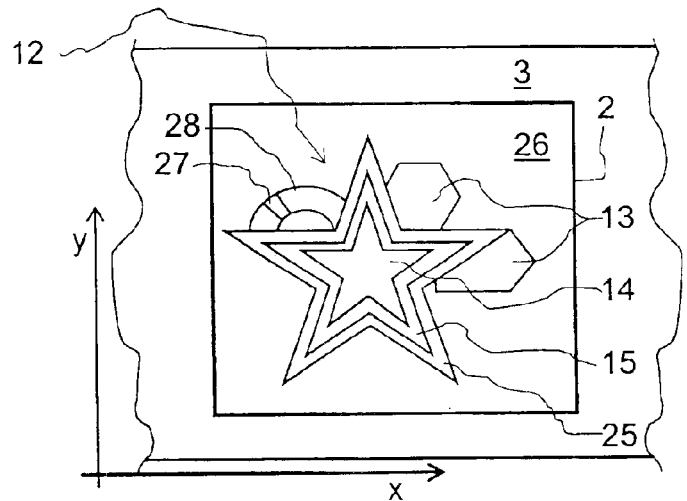
FIG. 2 shows a plan view of the security element.

FIG. 2 shows a portion of the substrate 3 which is in a plane defined by rectangular co-ordinates x, y. The security element 2 which is cut out of the plastic laminate and glued onto the substrate 3 has a surface pattern 12 which is visible through the cover layer 4 and the shaping layer 5 (FIG. 1). The surface pattern 12 is composed mosaic-like of surface elements 13, 14, 15. The surface elements 13, 14, 15 are occupied by the optically effective structures 9 and at the interface 8 (FIG. 1) between the shaping layer 5 and the protective layer 6 reflect the light 11 incident through the layers 4, 5 (FIG. 1). The optically effective structures 9 which are formed in the further surface elements 13 are diffraction gratings, light-scattering relief structures and/or flat mirror surfaces and form the optically variable surface pattern 12 which is described for example in EP 0 105 099 A1. In an embodiment of the optically variable surface pattern 12, at least one transparent location 10 (FIG. 1) adjoins at least one of the surface elements 13, 14, 15.

At least two surface elements 14, 15 form a feature which is to be checked and by means of which a copy of the security element 2 can be distinguished from an original of the security element 2. Each of the two surface elements 14, 15 has a structure 9 for diffracting visible incident light 11, with an optically effective profile height h (FIG. 1), the relief function of which is a superimposition of a low-frequency grating structure G(x, y) with a high-frequency relief structure R(x, y). The low-frequency grating structure G(x, y) is of a known profile, such as for example a sinusoidal or rectangular profile, a symmetrical or asymmetrical sawtooth-shaped profile and so forth. The high-frequency relief structure R(x, y) is of a spatial frequency $f_R$ of at least 2,500 lines per millimeter. The low-frequency grating structure G(x, y) on the other hand is of a low grating spatial frequency $f_G$ of for example fewer than 1,000 lines/millimeter. In that respect it is to be noted that the relief spatial frequency $f_R$ must be at least ten times higher than the grating spatial frequency $f_G$ in order to avoid unwanted modulation effects. Preferably the grating spatial frequency $f_G$ is of a value of between 100 lines/millimeter and 500 lines/millimeter.

The relief structure R(x, y) alone is a diffraction grating which, because of the high relief spatial frequency $f_R$, diffracts the incident light 11 only into the zero order and the profile shape of which in itself is unimportant. The diffracted light is reflected at the same angle as the incident light 11 includes in relation to a surface normal of the security element 2, that is to say such a diffraction grating behaves like a mirror, except that certain colors are missing in the spectrum of the diffracted light, in dependence on the optically effective profile height $h_R$. Because of the high relief spatial frequency $f_R$, the levels of diffraction efficiency $E_{TE}$, $E_{TM}$ of the relief structure R(x, y) for TE and TM polarized light are generally different. While the TE polarized light is reflected with a high level of diffraction efficiency $E_{TE}$ practically independently of the optically effective profile height $h_R$ at the relief structure R(x, y), the level of diffraction efficiency $E_{TM}$ for the TM polarized light rapidly falls with increasing profile height $h_R$ to a first minimum where the polarization effect of the relief structure R(x, y) on the incident light 11 is therefore at its greatest. If the direction of the light 11 which is incident in unpolarized manner, the surface normal and the vector describing the relief structure R(x, y) are in one diffraction plane, then the electrical field vector of the p-polarized light oscillates in parallel relationship with that diffraction plane. The p-polarized light is therefore absorbed by the relief structure R(x, y). In contrast the electrical field vector of the s-polarized light oscillates in perpendicular relationship to the diffraction plane and in parallel relationship to the relief grooves of the relief structure R(x, y). The s-polarized light is reflected by the relief structure R(x, y). If the relief structure R(x, y) is rotated through 90° in its plane, in which case now the relief grooves of the relief structure R(x, y) are oriented in parallel relationship with the diffraction plane, the s-polarized light is absorbed and the p-polarized light is reflected. Therefore, the light which is diffracted into the zero order by the relief structure R(x, y) is polarized linearly, that is to say, the relief structure R(x, y) acts as a polarizer for the non-polarizedly incident light 11 and as an analyzer for the polarizedly incident light 11.

The optically effective relief profile height $h_R$ of the relief structure R(x, y) is to be in the range with a high polarization capability. The optically effective relief profile height $h_R$ is therefore of a value from the range of between 150 nm and 220 nm; preferably the optically effective relief profile height $h_R$ however is selected from the narrower range of between 170 nm and 200 nm.

The optically effective grating profile height $h_G$ of the grating structure G(x, y) is to be selected to be greater than the optically effective relief profile height $h_R$. The optically effective grating profile height $h_G$ is preferably of a value from the range of between 250 nm and 500 nm, wherein the value of half a wavelength O of the incident light 11 is preferably selected for the optically effective grating profile height $h_G$. In that respect it is to be noted that the wavelength O is reduced by the factor n in the shaping layer 5, in which respect n is the refractive index of the material of the layer 5. The refractive index n is for example of a value n=1.55. For the same reason the geometrical profile heights shaped in the shaping layer 5 are smaller by the factor n than the above-noted optically effective profile heights $h_G$, $h_R$. The low-frequency grating structure G(x, y) alone diffracts the incident light 11 into a plurality of diffraction orders at least in dependence on the grating spatial frequency $f_G$.

Figure 3:
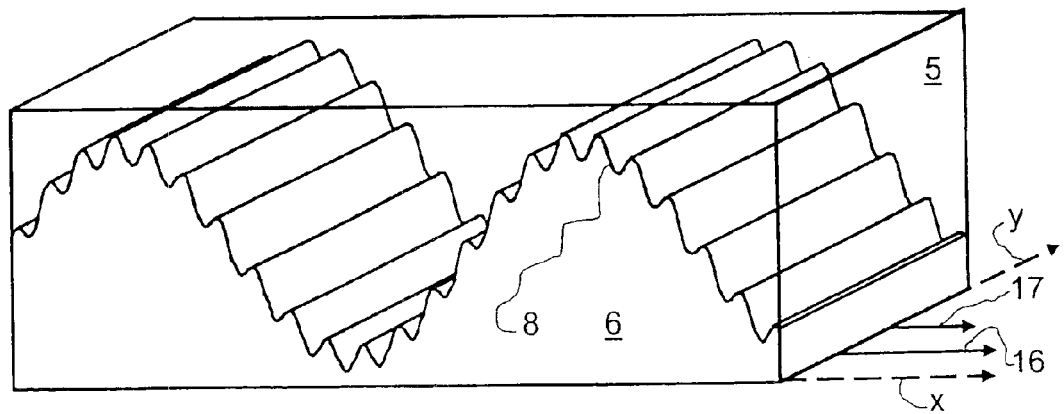
FIG. 3 shows a first diffraction structure.

FIG. 3 shows a portion from the layer composite 1 in the first surface element 14 (FIG. 2) with the shaping layer 5 and the protective layer 6. The interface 8 is shaped by the diffraction structure B(x, y). The diffraction structure B(x, y) is a function of the rectangular co-ordinates x and y which define a base area of the portion from the layer composite 1. The diffraction structure B(x) shown in FIG. 3 is the result of additive superimposition of the sinusoidal grating structure G(x) with the sinusoidal relief structure R(x), that is to say B(x)=G(x)+R(x). A grating vector 16 of the grating structure G(x) and a relief vector 17 of the relief structure R(x) are oriented substantially parallel. That parallelism of the grating vector 16 and the relief vector 17 is a feature of the diffraction structure B(x, y) in the first surface element 14 (FIG. 2).

Figure 4:
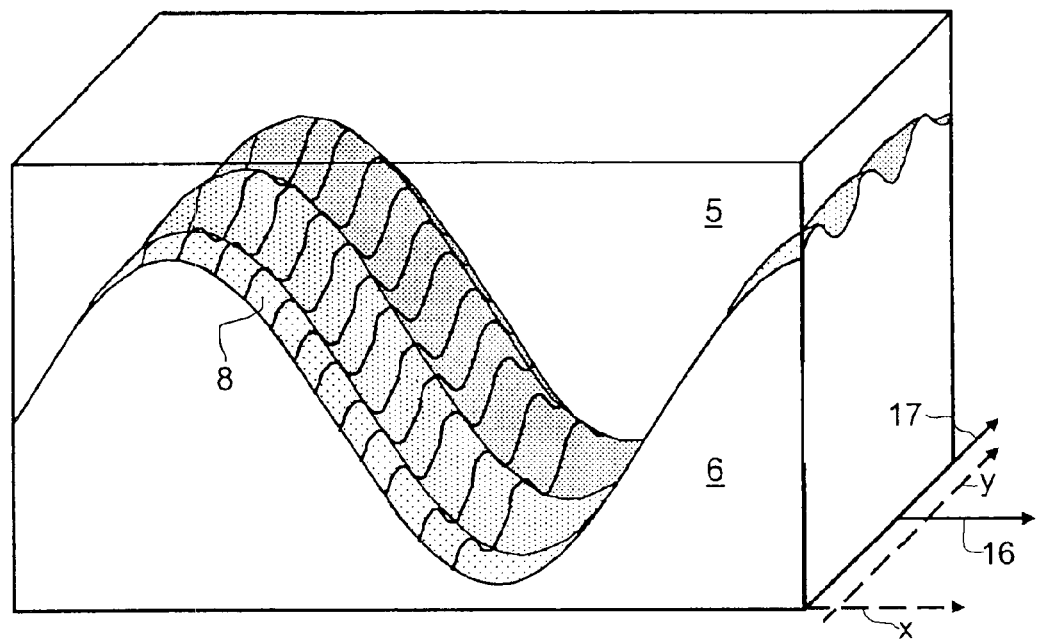
FIG. 4 shows a second diffraction structure.

FIG. 4 shows a portion from the layer composite 1 in the second surface element 15 (FIG. 2) with the interface 8 between the shaping layer 5 and the protective layer 6. The grating vector 16 and the relief vector 17 are oriented in mutually orthogonal relationship in the plane of the co-ordinates x and y. For example the sinusoidal grating structure G(x) is only a function of the co-ordinate x while the sinusoidal relief structure R(y) is only dependent on the co-ordinate y. Additive superimposition of the grating structure G(x) with the relief structure R(y) gives the diffraction structure B(x, y) which is dependent on the two co-ordinates x, y, wherein B(x, y)=G(x)+R(y). For reasons relating purely to clarity of the drawing, in FIG. 4 the interface 8 with the troughs of the relief structure R(y), which are disposed one behind the other, are denoted by dot patterns of differing densities. A feature of the diffraction structure B(x, y) in the second surface element 15 forms the right angle between the grating vector 16 and the relief vector 17.

Figure 5:
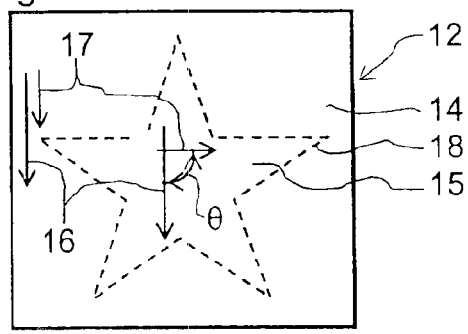
FIG. 5 shows a surface pattern in daylight.

FIG. 5 shows a surface pattern 12 which only consists of the first and second surface elements 14, 15. In a general form the diffraction structure B(x, y) depends on an azimuth angle T of the relief vector 17, which is related to the grating vector 16, that is to say B(x, y, T). In the first surface element 14 the azimuth angle is from the range T=0° to 30° while in the second surface element 15 the azimuth angle T is of a value from a range of between about 60° and 90°. The polarization behavior described hereinafter is at its most pronounced if the azimuth angle T is exactly of a value of 0° or 90° respectively. In order to take account of that situation the grating vector 16 and the relief vector 17 in the first surface element 14 are substantially parallel, that is to say they include a value in respect of the azimuth angle T of about 30° to the preferred value 0°. The azimuth angle T which can be used in the second surface element 15 is a substantially right angle, that is to say it is of a value of from about 60° to the preferred value of 90°.

The surface patterns 12 with the diffraction structures B(x, y, T) have the advantage that the diffraction structures B(x, y, T) cannot be copied from an original of the security element 2 (FIG. 1), with holographic means. More specifically a holographic copy has structures which diffract the incident light 11 in the same manner as the low-frequency grating structures G(x, y), but the light-polarizing action of the high-frequency relief structures R(x, y) on the diffracted light is lacking. Checking of the polarization capability therefore makes it possible to distinguish copies from the original.

In the first and second surface elements 14, 15, the grating structures G(x, y) involve the same parameters. The two relief structures R(x, y) differ only in respect of the azimuthal orientation of their relief vector 17. The two diffraction structures B(x, y, T=0°) and B(x, y, T=90°) diffract the incident light 11 (FIG. 1) and divide the diffracted light in a plurality of diffraction orders in a colored relationship. The action of the relief structures R(x, y) which are superimposed on the grating structures G(x, y) manifests itself in the linear polarization of the diffracted light, which corresponds to the polarization capability of the relief structures R(x, y). So that the first and second surface elements 14, 15 are visible to an observer at the same time, the grating vector 16 in the first surface element 14 and the grating vector 16 in the second surface element 15 must be oriented in substantially parallel relationship. If the light 11 incident on the surface pattern 12 is not linearly polarized, as is the case with usual illumination or in daylight, the two surface elements 14, 15 appear equally bright to the observer on both sides of a common boundary 18 and of the same color, that is to say the contrast between the two surface elements 14, 15 is so slight that it is not possible to perceive the common boundary 18.

Figure 6:
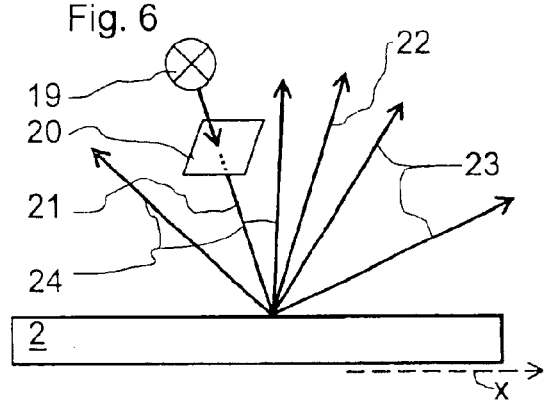
FIG. 6 shows a lighting apparatus.

FIG. 6 shows a lighting apparatus for checking the security element 2. The diffraction plane is the plane of the drawing in the view shown in FIG. 6 and contains the surface normal onto the security element 2 and the co-ordinate x. A light source 19 for producing almost white light projects through a polarization filter 20 focused linearly polarized light 21 in parallel relationship with the diffraction plane onto the surface pattern 12 (FIG. 5) of the security element 2. A part of the polarized light 21 is deflected as reflected light and/or as light which is reflected into the zero diffraction order, in a reflection direction 22 which is predetermined by the laws of reflection. In contrast a further part is diffracted into positive diffraction orders 23 and negative diffraction orders 24. As the diffraction structures B(x, y, T=0°) and B(x, y, T=90°), have differing polarization characteristics, the two surface elements 14, 15 can be distinguished in linearly polarized light 21.

Figure 7:
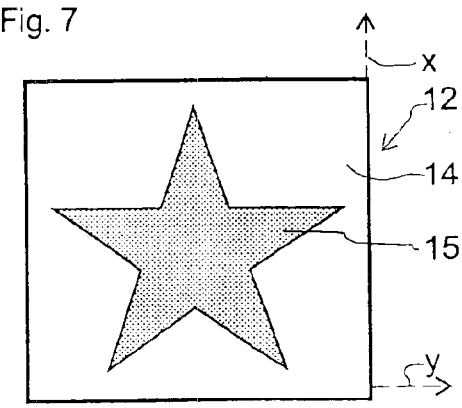
FIG. 7 shows the surface pattern in s-polarized light.

In FIG. 7 the surface pattern 12 is lit with s-polarized light 21 (FIG. 6). The s-polarized light 21 is reflected in the first surface element 14 as the grating vector 16 (FIG. 3) and the relief vector 17 (FIG. 3) are oriented substantially parallel to the co-ordinate x. In contrast the s-polarized light 21 is absorbed in the second surface element 15, as the grating vector 16 is oriented parallel to the co-ordinate x and the relief vector 17 (FIG. 5) includes a substantially right angle to the grating vector 16. The second surface element 15 therefore stands out markedly as a dark surface from the light first surface element 14.

Figure 8:
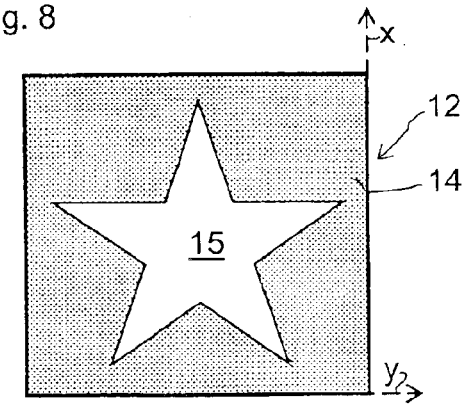
FIG. 8 shows the surface pattern in p-polarized light.

In FIG. 8 the same surface pattern 12 is lit with p-polarized light 21 (FIG. 6) which is absorbed in the first surface element 14 and reflected in the second surface element 15. The second surface element 15 therefore stands out markedly as a light surface from the dark surface of the first surface element 14.

The two surface elements 14, 15 advantageously adjoin each other so that the contrast is most markedly visible.

EXAMPLE 1

The grating structure $G(x)=0.5\xi h_G\xi\sin(x)$ is a sine function with a period of 5,000 nm and an optically effective profile height $h_G=450$ nm. The relief structure $R(x)=0.5\xi h_R\xi\sin(x)$ also follows a sine function with a period of 333 nm and an optically effective profile height $h_R=185$ nm. For p-polarized light 21 the diffraction efficiency of the diffraction structure B(x)=G(x)+R(x) in all diffraction orders 23, 24 (FIG. 6) is very low while for s-polarized light 21 the diffraction structure B(x) has a diffraction efficiency in the third diffraction order of over 10% and in other diffraction orders of more than 5%.

EXAMPLE 2

Figure 9:
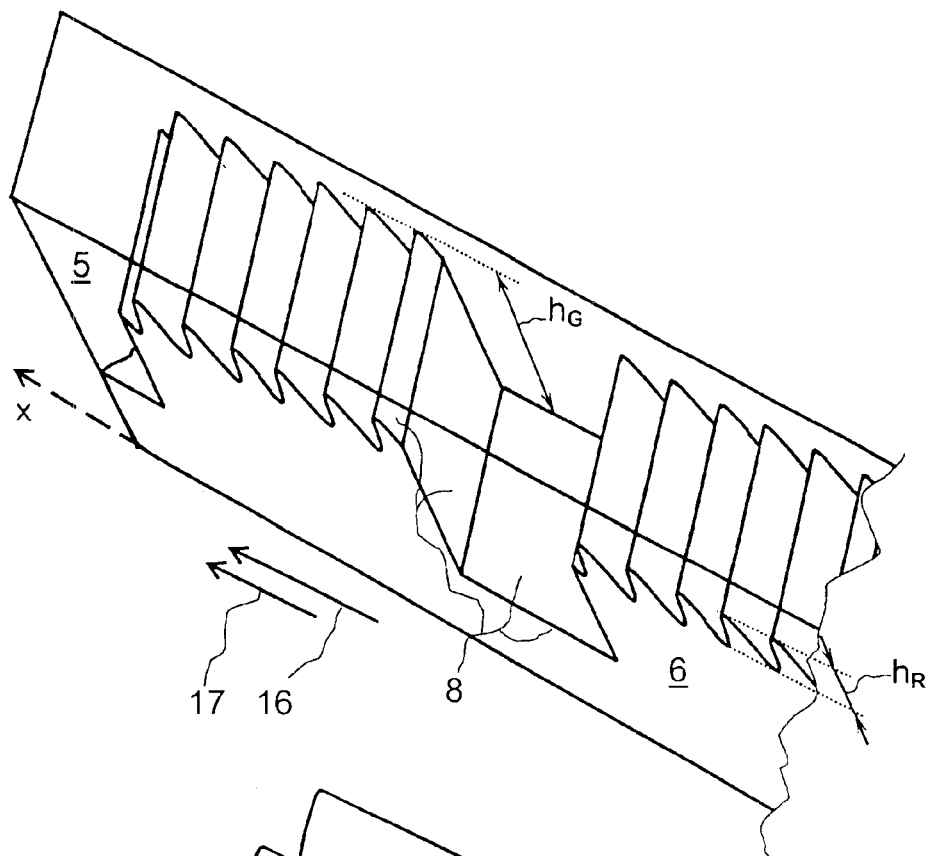
FIG. 9 shows a third diffraction structure.

The diffraction structure B(x) in FIG. 9 is a multiplicative superimposition $B(x)=G(x)\xi\{R(x)+C\}$. The grating structure G(x) is a rectangular function with the function values [0, $h_G$], a period of 4,000 nm and an optically effective profile height $h_G=320$ nm. The relief structure $R(x)=0.5\xi h_R\xi\sin(x)$ is a sine function with a period of 250 nm and an optically effective profile height $h_R=200$ nm. C denotes a constant, wherein $C=h_G-h_R$. The grating vector 16 and the relief vector 17 are parallel to the co-ordinate axis x. The interface 8 between the layers 5, 6 is modulated on the raised surfaces of the rectangular structure with the relief structure R(x), while the interface 8 is smooth on the bottom of the grooves of the rectangular structure. For p-polarized light 21 (FIG. 6) the diffraction efficiency of the diffraction structure B(x), besides in the zero diffraction order in the direction 22, is very low in all diffraction orders 23, 24 (FIG. 6), while for s-polarized light 21 the diffraction structure B(x) has a high level of diffraction efficiency only in the +1st and −1st diffraction orders.

Figure 10:
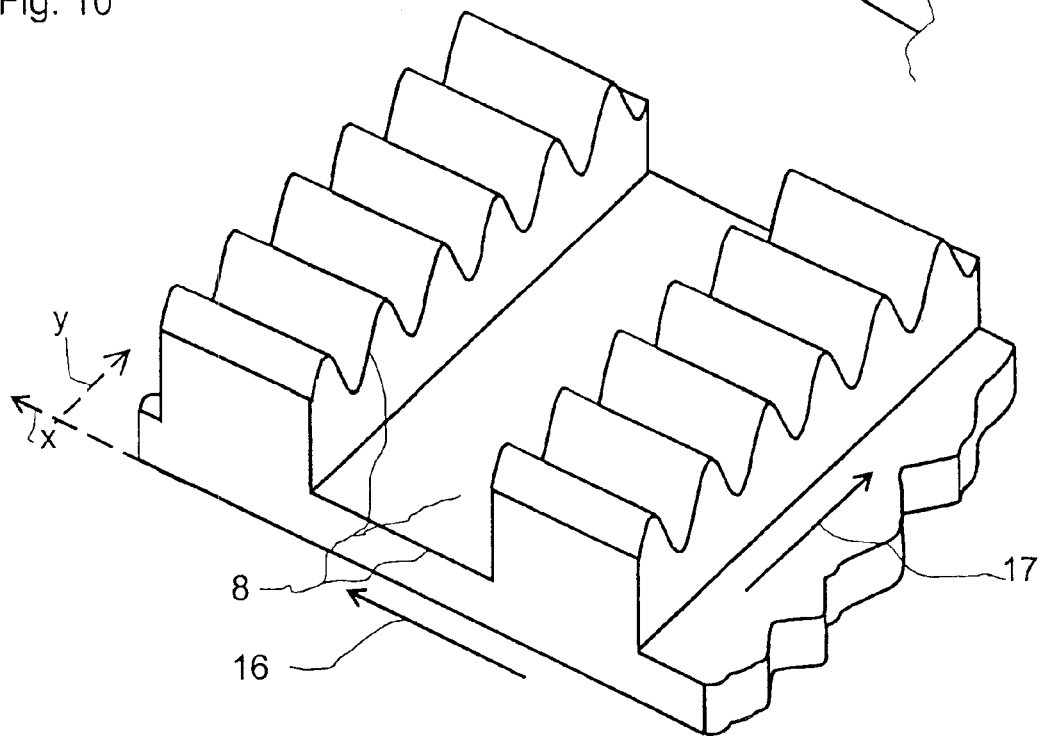
FIG. 10 shows a fourth diffraction structure.

In FIG. 10 the multiplicative superimposition of the rectangular grating structure G(x) with the relief structure R(y) produces the diffraction structure B(x, y) which is shaped into the interface 8. The grating structure G(x) and the relief structure R(y) involve the same parameters as in the above-described diffraction structure B(x) with the exception of the relief vector 17 which points in the direction of the co-ordinate y instead of x. Except in the zero diffraction order in the direction 22 (FIG. 6) the diffraction structure $B(x, y)=G(x)\xi\{R(y)+C\}$ for s-polarized light 21 has very low levels of diffraction efficiency in all diffraction orders 23, 24 (FIG. 6), while for p-polarized light 21 (FIG. 6) the diffraction structure B(x) has a high diffraction efficiency only in the +1st and −1st diffraction orders.

If (FIG. 5) the diffraction structure B(x) in the first surface element 14 and the diffraction structure B(x, y) in the second surface element 15 are arranged as described hereinbefore, the surface pattern 12 involves the behavior which is described with reference to FIGS. 5, 7 and 8.

After a rotary movement of the surface pattern 12 (FIG. 5) in its plane while retaining the lighting direction and the observation direction, no more light which is diffracted into the diffraction orders 23, 24 passes into the eye of the observer as long as the grating vector 16 faces out of the diffraction plane. If the security element 2 (FIG. 6) is tilted in such a way that the observer receives light from the reflection direction 22, he will see the colored light which is diffracted into the zero diffraction order and note that the surface brightness of the two surface elements 14, 15 (FIG. 5) is independent of the rotary angle, provided that lighting of the surface pattern 12 is effected with non-polarized light. If lighting is effected with linearly polarized light 21 (FIG. 6) the surface brightnesses of the two surface elements 14, 15 are interchanged after each rotation through 90°.

Going back now to FIG. 2: in the surface pattern 12 the first surface element 14 with the diffraction structure B(x, y, T=0°) and the second surface element 15 with the diffraction structure B(x, y, T=90°) advantageously alternate cyclically transversely with respect to their longitudinal extent. In the linearly polarized light 21 (FIG. 6) that affords a striking pattern, which verifies authenticity, within the surface pattern 12. In the drawing in FIG. 2 for example in the first surface element 14 the diffraction structure corresponds to B(x, y, T=0°), in the second surface element 15 the diffraction structure corresponds to B(x, y, T=90°), in a zone 25 the diffraction structure corresponds to B(x, y, T=0°), in an outer zone 26 the diffraction structure corresponds to B(x, y, T=90°), and so forth.

So that the surfaces of the surface elements 14, 15 and of the zones 25, 26 are clearly visible with the naked eye, the elongate surface elements 13, 14, 15 and the zones 25, 26 respectively are of transverse dimensions of at least 0.5 millimeters.

For the sake of simplicity hitherto the surface patterns 12 have been considered with at least one pair of surfaces [14, 15] from the first and second surface elements 14, 15, wherein the grating vectors 16 (FIG. 3) of the grating structures G(x, y) are oriented in the two surface elements 14, 15 along a direction, for example the co-ordinate x. In another embodiment of the security element 2 a plurality of pairs of surfaces [14, 15] can be arranged in the surface pattern 12 in such a way that the grating vectors (16) of each pair of surfaces [14, 15] differ from the grating vectors 16 of the other pair of surfaces [14, 15] by an angle at the azimuth.

By way of example inserted in a circular ring portion 27 of the surface pattern 12 is a pair of surfaces [14, 15] whose two grating vectors 16 are oriented radially, that is to say in slightly divergent relationship. Without substantial losses in terms of the observable effect and the visibility of the diffraction structures B(x, y, T), the two grating vectors 16 of the same pair of surfaces [14, 15] can include an angle at the azimuth in the range of 0° to 10°. In order to achieve the above-described visible effect, it is sufficient if the two grating vectors 16 of the pair of surfaces [14, 15] are oriented only substantially parallel, for example in the range of 0° to 10°. In a preferred embodiment the two grating vectors 16 of the pair of surfaces [14, 15] are parallel. By way of example, in another embodiment, the same circular ring portions 27 are arranged in mutually juxtaposed relationship on a circular ring 28, wherein a second surface element 15 follows a first surface element 14 and the second surface element 15 is in turn followed by a first surface element 14 and so forth, with radially oriented grating vectors 16. That cyclic arrangement has the advantage that, irrespective of the position which the security element 2 assumes upon a rotary movement in its plane, there are always at least a first surface element 14 and a second surface element 15 oriented in such a way that they are visible to the observer and have the above-described effect when lit with polarized light 21. The first surface element 14 and the second surface element 15 belong either to one of the pairs of surfaces [14, 15] or to two pairs of surfaces [14, 15] which are adjacent on the circular ring 28.

What is claimed is:

1. A security element comprising a plastic laminate with a surface pattern composed of mosaic-like surface elements, wherein the plastic laminate has a shaping layer arranged between a cover layer and a protective layer and an interface between the shaping layer and the protective layer, the interface reflecting light incident through the cover layer and the shaping layer, and wherein optically effective structures of the surface elements are shaped into the shaping layer at the interface, wherein arranged in the surface pattern is at least one pair of surfaces formed from a first surface element and a second surface element, the two surface elements each have a diffraction structure produced from a superimposition of a grating structure with a relief structure, in the first surface element a grating vector of the grating structure and a relief vector of the relief structure are substantially parallel and in the second surface element the grating vector of the same grating structure and the relief vector of the same relief structure include a substantially right angle, the grating vectors of the grating structures in the two surface elements are substantially parallel, a relief spatial frequency of the two relief structures is greater than 2,500 lines/millimeter, and the relief spatial frequency is at least ten times higher than a grating spatial frequency of the two grating structures.

2. A security element as set forth in claim 1, wherein the grating spatial frequency of the grating structure is of a value from the range of 100 lines/millimeter to 500 lines/millimeter.

3. A security element as set forth in claim 1, wherein the reflecting interface is formed by a metallic layer of high electrical conductivity.

4. A security element as set forth in claim 1, wherein the relief structure is a sine function.

5. A security element as set forth in claim 1, wherein the grating structure is a sine function.

6. A security element as set forth in claim 5, wherein an optical profile height of the grating structure is of a value from the range of 350 nm to 550 nm and the optical profile height of the grating structure is at least twice as great as the optical profile height of the relief structure.

7. A security element as set forth in claim 1, wherein the grating structure is a rectangular function.

8. A security element as set forth in claim 7, wherein an optical profile height of the grating structure is of a value from the range of 250 nm to 400 nm and the optical profile height of the grating structure is at least 100 nm greater than the optical profile height of the relief structure.

9. A security element as set forth in claim 1, wherein the grating structure is a symmetrical or asymmetrical sawtooth function.

10. A security element as set forth in claim 1, wherein an adhesive layer is applied to the protective layer for connection to a substrate.

* * * * *

UNITED STATES PATENT AND TRADEMARK OFFICE
CERTIFICATE OF CORRECTION

PATENT NO. : 6,909,547 B2 Page 1 of 1
APPLICATION NO. : 10/496321
DATED : June 21, 2005
INVENTOR(S) : Weiteneder et al.

It is certified that error appears in the above-identified patent and that said Letters Patent is hereby corrected as shown below:

COVER PAGE item 75:

Erroneous Information

Inventors: Christoph Weiteneder, Neuchatel, (CH)
Wayne Robert Tompkin, Baden, (CH)

Correct Information

Inventors: Christoph Weiteneder, Neuchatel, (CH)
Wayne Robert Tompkins, Baden, (CH)
Andreas Schilling, Hagendom, (CH)

Signed and Sealed this

Twelfth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 6,909,547 B2  
APPLICATION NO. : 10/496321  
DATED : June 21, 2005  
INVENTOR(S) : Weiteneder et al.

Page 1 of 1

It is certified that error appears in the above-identified patent and that said Letters Patent is hereby corrected as shown below:

COVER PAGE item 75:

Erroneous Information

Inventors: Christoph Weiteneder, Neuchatel, (CH)
Wayne Robert Tompkin, Baden, (CH)

Correct Information

Inventors: Christoph Weiteneder, Neuchatel, (CH)
Wayne Robert Tompkins, Baden, (CH)
Andreas Schilling, Hagendorn, (CH)

This certificate supersedes the Certificate of Correction issued February 12, 2008.

Signed and Sealed this

Seventeenth Day of March, 2009

JOHN DOLL
*Acting Director of the United States Patent and Trademark Office*